United States Patent
Sigl

(10) Patent No.: US 6,714,220 B2
(45) Date of Patent: *Mar. 30, 2004

(54) INTERACTIVE INPUT WITH LIMIT-VALUE MONITORING AND ON-LINE HELP FOR A PALMTOP DEVICE

(75) Inventor: Klaus Sigl, Feucht (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/487,727

(22) Filed: Jan. 19, 2000

(65) Prior Publication Data

US 2003/0103066 A1 Jun. 5, 2003

(51) Int. Cl.⁷ .............................................. G06F 3/00
(52) U.S. Cl. .................... 345/780; 345/172; 345/825; 345/840; 345/864
(58) Field of Search ................. 345/169, 172, 345/173, 702, 705, 708, 710, 780, 781, 790, 794, 809, 810, 825, 835, 840, 861, 902

(56) References Cited

U.S. PATENT DOCUMENTS

| | | | | |
|---|---|---|---|---|
| 4,763,356 A | * | 8/1988 | Day, Jr. et al. | 345/173 X |
| 5,260,697 A | * | 11/1993 | Barrett et al. | 345/173 |
| 5,475,835 A | * | 12/1995 | Hickey | 707/104.1 |
| 5,561,446 A | * | 10/1996 | Montlick | 345/173 |
| 5,777,605 A | * | 7/1998 | Yoshinobu et al. | 345/173 |
| 5,838,384 A | * | 11/1998 | Schindler et al. | 345/810 X |
| 5,909,372 A | * | 6/1999 | Thybo | 700/83 |
| 5,920,303 A | * | 7/1999 | Baker et al. | 345/172 |
| 5,973,612 A | | 10/1999 | Deo et al. | |
| 6,026,233 A | * | 2/2000 | Shulman et al. | 717/113 |
| 6,046,742 A | * | 4/2000 | Chari | 345/734 |
| 6,069,326 A | * | 5/2000 | Henson et al. | 178/18.01 |
| 6,211,870 B1 | * | 4/2001 | Foster | 345/840 X |
| 6,236,743 B1 | * | 5/2001 | Pratt | 382/128 |
| 6,320,577 B1 | * | 11/2001 | Alexander | 345/440.1 |
| 6,359,572 B1 | * | 3/2002 | Vale | 345/172 X |
| 6,516,227 B1 | * | 2/2003 | Meadows et al. | 607/46 |

FOREIGN PATENT DOCUMENTS

| | | |
|---|---|---|
| EP | 0 844 553 A1 | 5/1998 |
| EP | 0 883 053 A2 | 12/1998 |

OTHER PUBLICATIONS

Want R. et al., "An Overview of the PARCTAB Ubiquitous Computing Experiment" IEEE Personal Communications, IEEE Communications Society, US, vol. 2, No. 6, Dec. 1, 1995, pp. 28–43.

* cited by examiner

*Primary Examiner*—John Cabeca
*Assistant Examiner*—X. L. Bautista
(74) *Attorney, Agent, or Firm*—Sughrue Mion, PLLC

(57) ABSTRACT

A computer system for interactively inputting parameter values. The computer system with a screen, memory and a set of parameters, comprises an interactive input field each for each of said set of parameters, a set of information items each for each of said set of parameters, said set of information items being stored in the memory; and a set of virtual keys stored in the memory. On selecting a parameter displayed on the screen, an interactive input field associated with the selected parameter and a subset of virtual keys is displayed on the screen. The subset of virtual keys comprises only those keys that are relevant to changing a value of the selected parameter.

32 Claims, 6 Drawing Sheets

INTERACTIVE INPUT WITH LIMIT-VALUE MONITORING AND ON-LINE HELP FOR A PALMTOP DEVICE

DESCRIPTION OF THE INVENTION

A. Field of the Invention

The present invention is related to inputting information into a palmtop device in an interactive manner. Specifically, the present invention provides a technique for inputting information related to values of parameters into a palmtop device interactively where the palmtop device has no associated keyboard. The present invention is embodied in a method for inputting information; a palmtop system that receives information interactively; a computer program product enabling a palmtop device to accept interactive input.

B. Background of the Invention

Palmtop PCs belong to one of the smallest classes of general purpose computing devices. Palmtop PCs typically run general purpose operating systems, for example, Windows CE® by Microsoft®. A typical palmtop PC has four to eight Mbyte RAM, an 80 MHz MIPS processor, a 240×320 pixel black and white display. Desktop and laptop PCs use a mouse-like device and a keyboard combination to input data. On the other hand, data is typically input into a palmtop PC using a pen and touch screen. The palmtop PCs typically communicate with their peripherals using protocols such as RS232, IrDa, etc. A compact flash slot is provided for making hardware expansions. The palmtop PCs boot from ROMs installed within them.

Palmtop PCs typically have only a black and white display of only 240×320 pixels. Therefore, the dialogs and other interactions with the palmtop PCs must be adapted to these restrictions in terms of size, coloring and spatial distribution. Most importantly, the user interface needs to be designed considering the relatively small display screens. For interacting with a palmtop PC, the user is provided with a pen. The pen is used in combination with the touch screen and a small number of physical entry keys (as opposed to virtual keys that are discussed hereunder). Palmtop PCs are not provided with a mouse-like device or a keyboard. In lieu of a regular keyboard, a virtual keyboard is displayed on the touch-sensitive screen. The users interface with the palmtop PC using the pen to make selections from the virtual keyboard.

Palmtop devices are often used for interfacing with control systems used in manufacturing facilities such as chemical plants. Data related to various parameters related to the control of the manufacturing facility is input using these palmtop devices. For example, FIG. 1 shows a typical palmtop screen display, where a current Ie1 is required to be set by the user. 1.1 is a first current that is required to be set by the user. 1.2 is a second current Ie2 that is required to be set by the user. 1.3 shows an upper limit value for the current. Likewise, 1.4 shows a lower limit value for the current. On the lower part of the screen a virtual keyboard 1.5 is displayed which is used by a plant operator to set the values of the current.

As can be readily seen from FIG. 1, a shortage of display space necessitates its optimal use in a palmtop PC. The space needs to be used for both the virtual keyboard and the parameters that need to be displayed. Specifically, as shown in FIG. 1, the lower limit value 1.4 is partially covered by the virtual keyboard 1.5. But then, there is a substantial amount of display space that is wasted. In this case, a large number of virtual keys are redundant since they are clearly useless in entering the value of the currents. For example, keys corresponding to the alphabets are useless for the specific example illustrated in FIG. 1.

Therefore, conventional palmtop PCs at least have a problem in that the use of the virtual keyboard occupies a substantial portion of the display screen, often overlaying at least some information that the user needs to see.

SUMMARY OF THE INVENTION

To solve the above-mentioned problems in conventional palmtop PCs it is an object of the present invention to provide a computer system where virtual a keyboard is less likely to overlay a required input parameter.

It is another objective of the present invention to provide a computer system where interactive help is provided for inputting parameter values.

It is another objective of the present invention to provide a computer program product to enable a palmtop PC to accomplish the above noted objectives.

To meet the objectives of the present invention there is provided a computer system with a screen, memory and a set of parameters, said system comprising an interactive input field for at least one parameter of said set of parameters, a set of information items for said at least one parameter, said set of information items being stored in the memory and a set of virtual keys stored in the memory, wherein on selecting said at least one parameter displayed on the screen, the interactive input field associated with the selected parameter and a subset of virtual keys is displayed on the screen, and wherein the subset of virtual keys are created dynamically based on said selected parameter.

Preferably the computer system is a palm-held PC.

Preferably said subset of keys comprise only those keys that are relevant to changing a value of the selected parameter.

Preferably the displayed subset of virtual keys does not overlay the displayed interactive input field.

Preferably the set of information items comprise parameter name, parameter type, and limit values for the parameter.

Preferably the system further comprises an interactive input field each for each of said set of parameters and a set of information items each for each of said set of parameters.

Still preferably the set of information items further comprises help information associated with the parameter.

Still preferably an error message is displayed when a user enters a value for the parameter that is outside of the limit values for the parameter.

Still preferably the help information is a help information in a Windows 95® format.

Another aspect of the present invention is a computer system comprising a palm-held computer and a memory, said memory comprising instructions, said instructions enabling the computer to enable a user to select a parameter by touching a touch-sensitive screen, said instructions further enabling the computer to display a subset of virtual keys that are dynamically created based on the parameter and said subset of virtual keys being sufficient to change the value of the parameter.

Preferably said instructions further enable the computer to monitor a value entered by the user so that said value is within a preset range of values for the selected parameter.

Preferably said instructions further enable the computer to display help information for the selected parameter on indication by the user.

Another aspect of the present invention is a method of inputting values for a parameter into a computer system comprising: selecting the displayed parameter on a screen; displaying a dialog including an interactive input field associated with the parameter on the screen; displaying a subset of virtual keys on the screen; and using the subset of virtual keys to input values for the parameter, wherein the subset of virtual keys are created dynamically based on said selected parameter.

Preferably, in the method, the displayed subset of virtual keys does not overlay the interactive input field.

Preferably, in the method, the subset of virtual keys comprises only those keys that are relevant to changing the value of the parameter.

Preferably, in the method, said parameter is associated with a set of information including parameter name, parameter type and limit values for the parameter.

Preferably, in the method, the set of information further comprises help information.

Still preferably, in the method, an error message is displayed on entering a value outside the limit values for the parameter.

Still preferably, in the method, the help information associated with the parameter is displayed using a Windows 95® help format.

Another aspect of the present invention is a computer program product, including a computer readable medium comprising instructions, said instructions comprising a selector code to enable a user to select a parameter displayed on a screen, a dialog code to display a dialog associated with the parameter on the screen, an information code to store information associated with the parameter, a keyboard code to display a subset of virtual keys on the screen, a data receiving code, to enable a user to input parameter values using the subset of virtual keys, wherein, the subset of virtual keys are created dynamically based on the selected parameter.

Preferably, in the computer program product, the displayed subset of virtual keys do not overlay an interactive input field associated with the parameter.

Preferably, in the computer program product, said subset of virtual keys comprises only those keys that are relevant to changing the value of the parameter.

Preferably, in the computer program product, said information comprises parameter name, parameter type and limit values of the parameter.

Preferably, in the computer program product, said information further comprises help information.

Preferably, in the computer program product, an error message is displayed on entering a value outside the limit values for the parameter.

BRIEF DESCRIPTION OF THE DRAWINGS

The above objectives and advantages of the present invention will become more apparent by describing in detail preferred embodiments thereof with reference to the attached drawings in which.

DETAILED DESCRIPTION OF THE PREFERRED EMBODIMENTS

A. Computer System

Figure 4:
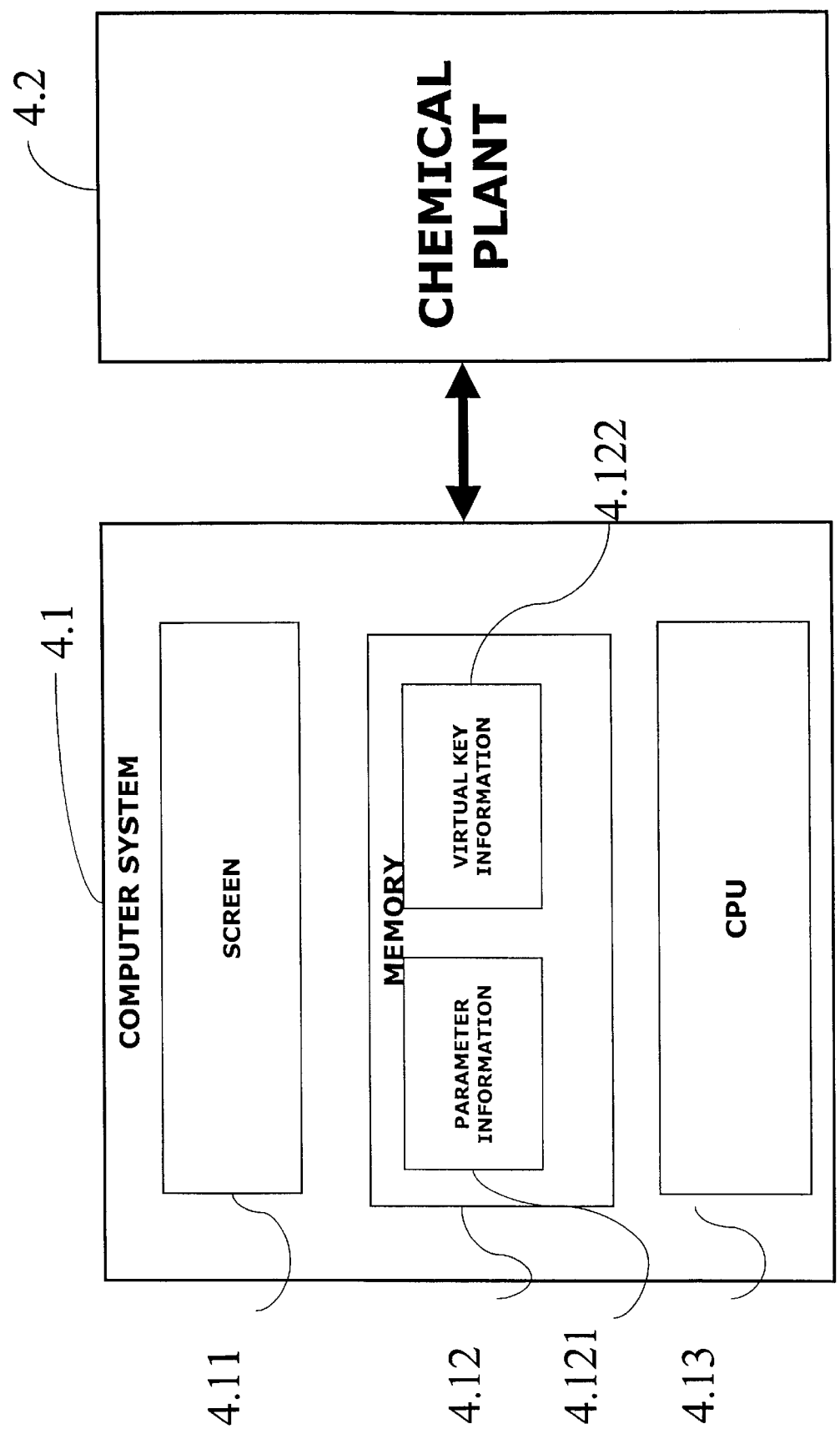
FIG. 4 shows a computer system according to a preferred embodiment of the present invention.

A preferred embodiment of the computer system according to the present invention is shown in FIG. 4. A palmtop PC computer system 4.1 is used to interface with a chemical plant 4.2. The chemical plant is controlled using a large number of parameters, for example, temperature, pressure, electrical current, etc. A plant operator or an automatic system sets a value for a specific parameter. The control system operates to ensure that the actual value of the parameter is within a certain range of the set point. The palmtop computer system comprises a screen 4.11, a CPU 4.13 and a memory 4.12. The memory further comprises information 4.121 on the parameters and further detailed information on each of the parameters. The memory also comprises information on a set of virtual keys that are used by the computer system.

Figure 2:
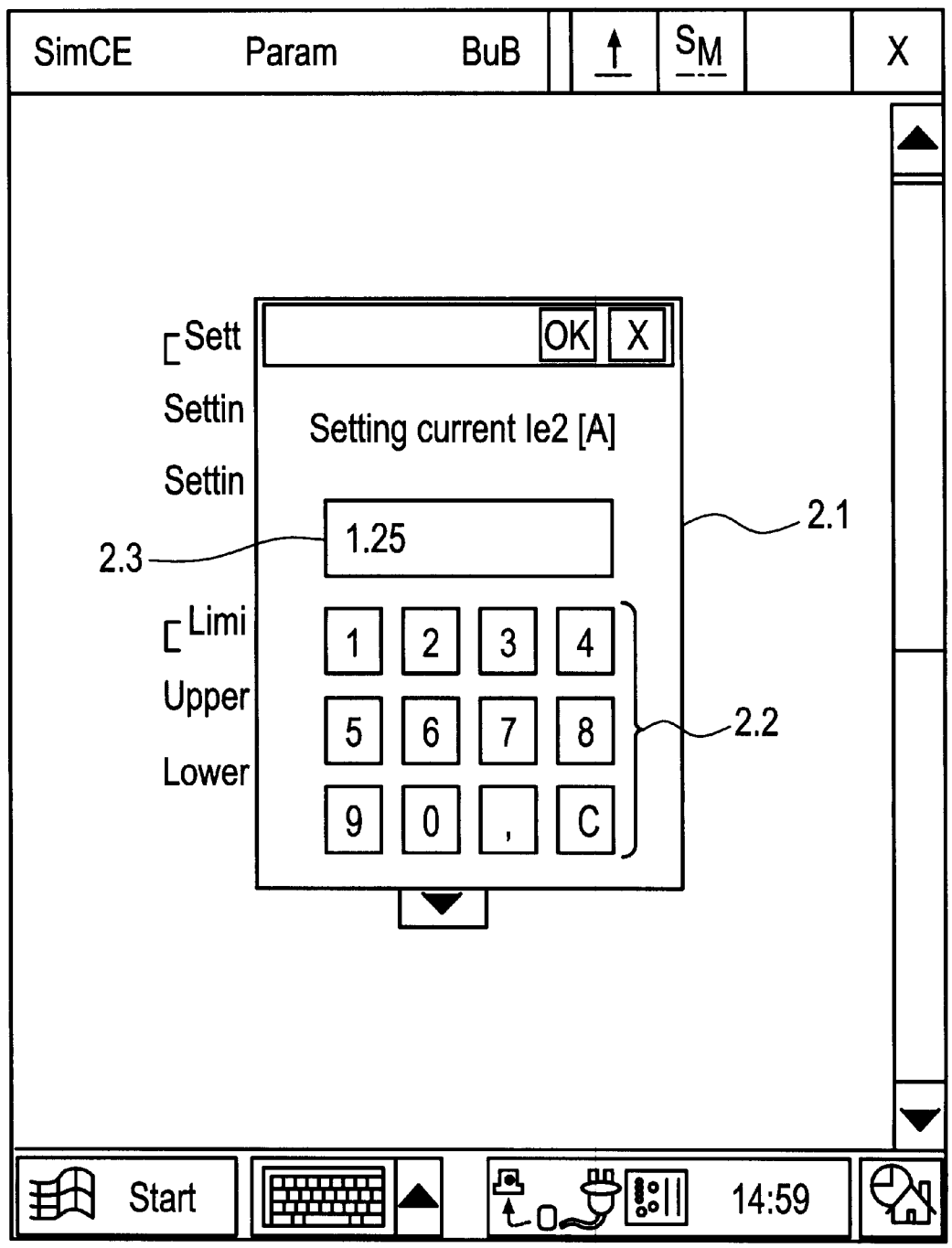
FIG. 2 shows a preferred embodiment of the present invention with a dialog box for inputting the value of a parameter and a virtual keyboard with only the relevant keys displayed.

The plant operator uses the palmtop PC computer system 4.1 to input values for parameters. For example, an aspect of the plant control requires input for the value of current. The plant operator selects the parameter from the screen. Once the parameter is selected, a dialog is displayed on the screen. FIG. 2 shows a preferred embodiment of the screen showing a dialog box 2.1 for inputting the value of a parameter and a virtual keyboard 2.2 with only the relevant keys displayed. As the value of the current is a number, only 0–9 number keys, a decimal point key and a clear key are required to be displayed. An interactive input field 2.3 is used to input parameter values.

Figure 1:
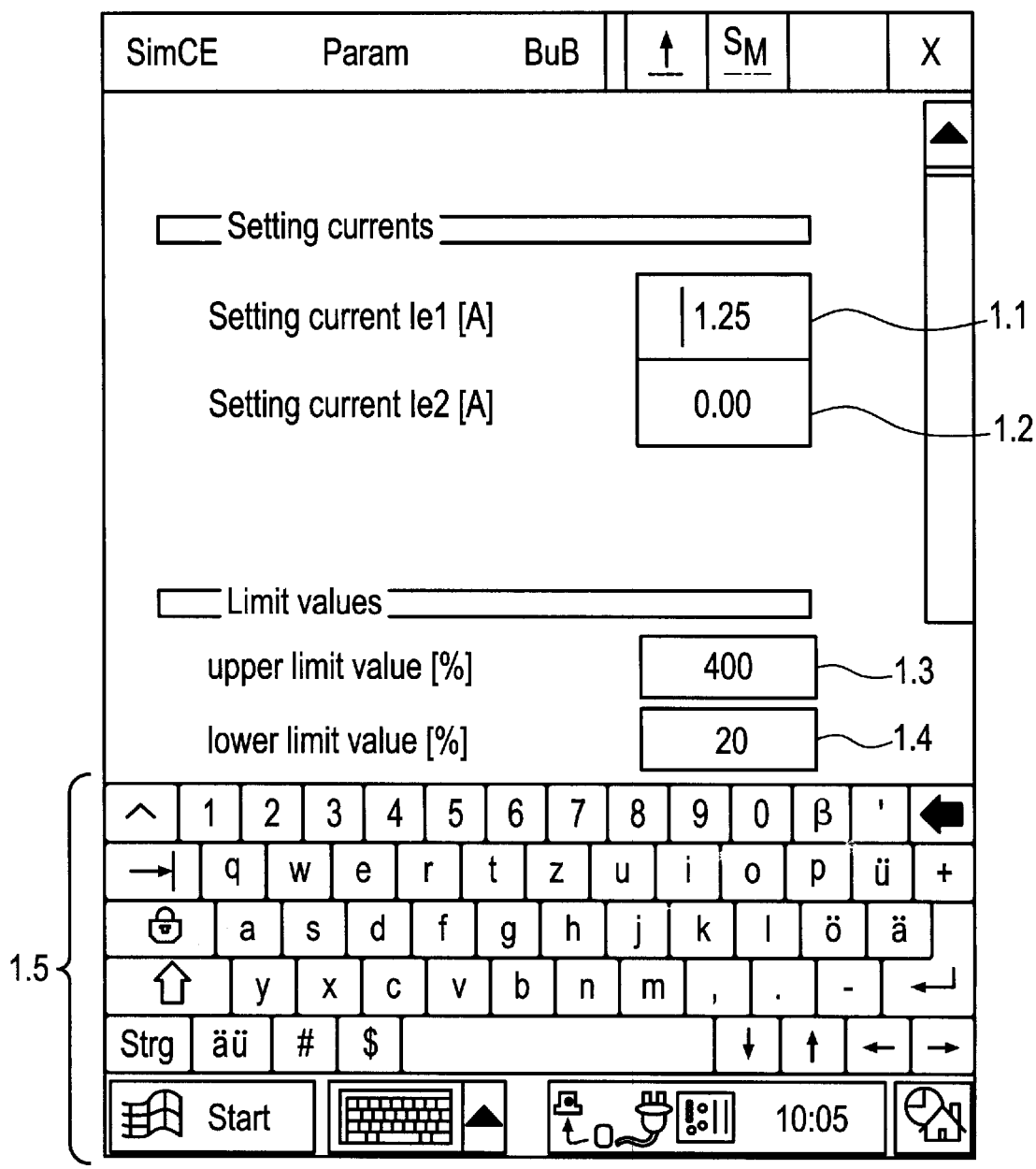
FIG. 1 shows a screen with a required input value covered by a virtual keyboard.

In an alternate embodiment of the screen according to the present invention, the virtual keyboard could appear much as shown in FIG. 1, except having, for example, the letter keys "a" througj "z" omitted. The remaining keys could be repositioned to fill in the gaps that would otherwise result. Such a keyboard could have keys of the same size as shown in FIG. 1, thereby reducing the screen area taken up by the virtual keyboard by roughly 50% and thereby avoiding overlaying the information shown on the base screen. Alternatively, the individual keys could be enhanced in size compared to those shown in FIG. 1, since the number of keys is greatly reduced.

Further, with respect to the preferred embodiment, the parameter itself is stored in memory 4.12 with a number of information items 4.121, including:

Parameter name

Parameter type: character chain, integer or floating-point number

Maximum limit value

Minimum limit value

Reference to help

The actual appearance of the input fields on the screen depends on the nature and type of the parameters. The dialog 2.1 shows only the parameter name for the parameter that is to be changed, and its present value. Additionally, only those virtual keys 2.2 from the set of virtual keys that are required for the parameter type are available to the user.

For example, in case of the current, the alphanumeric characters are redundant. Therefore, only the integer keys and related keys are displayed. As a result, the keys that are displayed can be displayed larger. The larger display of virtual keys makes the system more user-friendly. The information for the set of virtual keys 4.122 is stored in memory.

An important improvement according to one aspect of the present invention is the limit-value-monitoring feature. If an input entered by the user is outside a specified range, the dialog preferably advises the user by means of a descriptive flag and prevents the value from being transferred to the system.

Another important improvement according to another aspect of the present invention is the provision of context-sensitive help for the parameters. The help provided includes additional information related to the type, purpose and interrelationships with other parameters. The user, by means of a help button, may also explicitly request this help.

Figure 5:
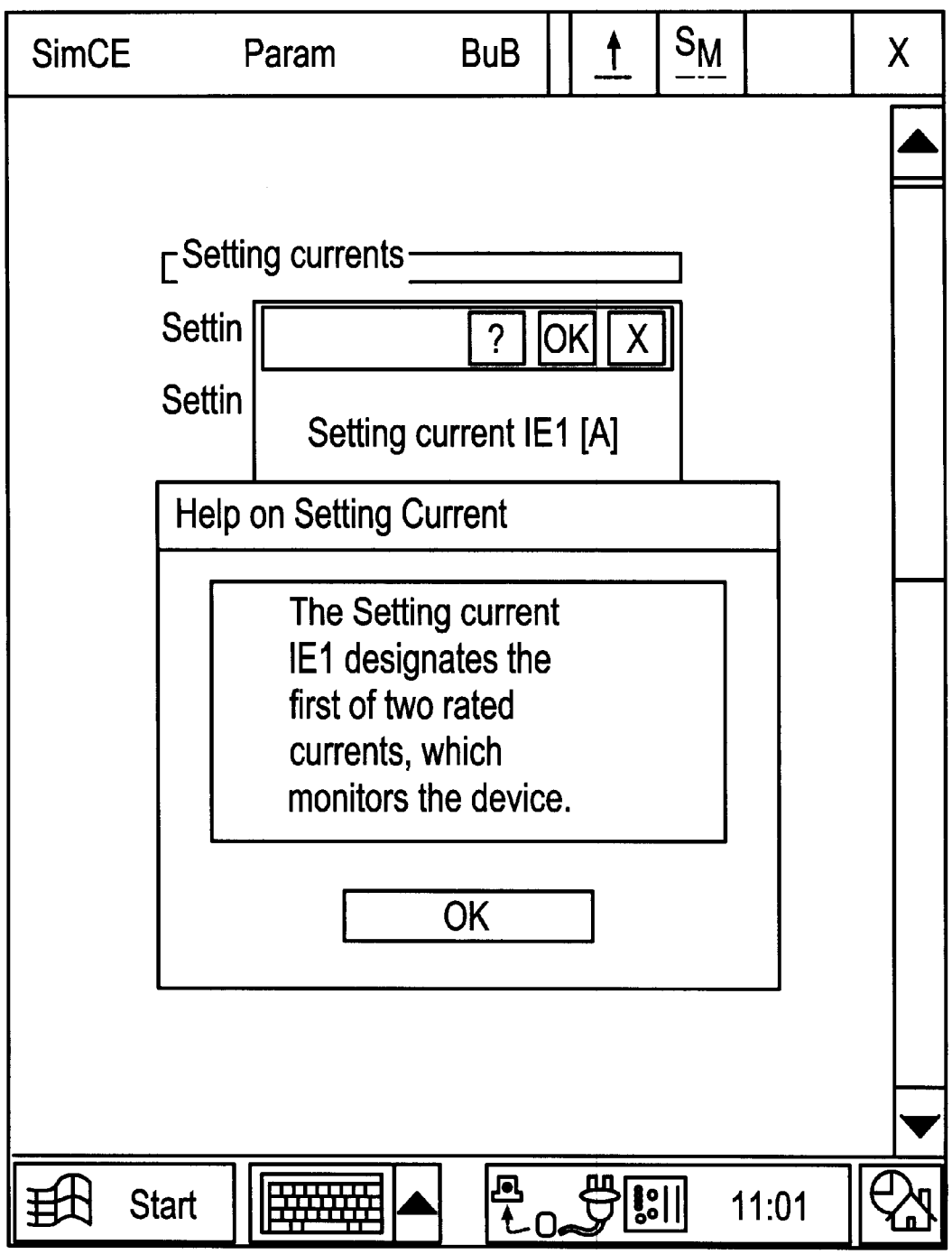
FIG. 5 shows a snapshot of a screen showing a help message.
Figure 6:
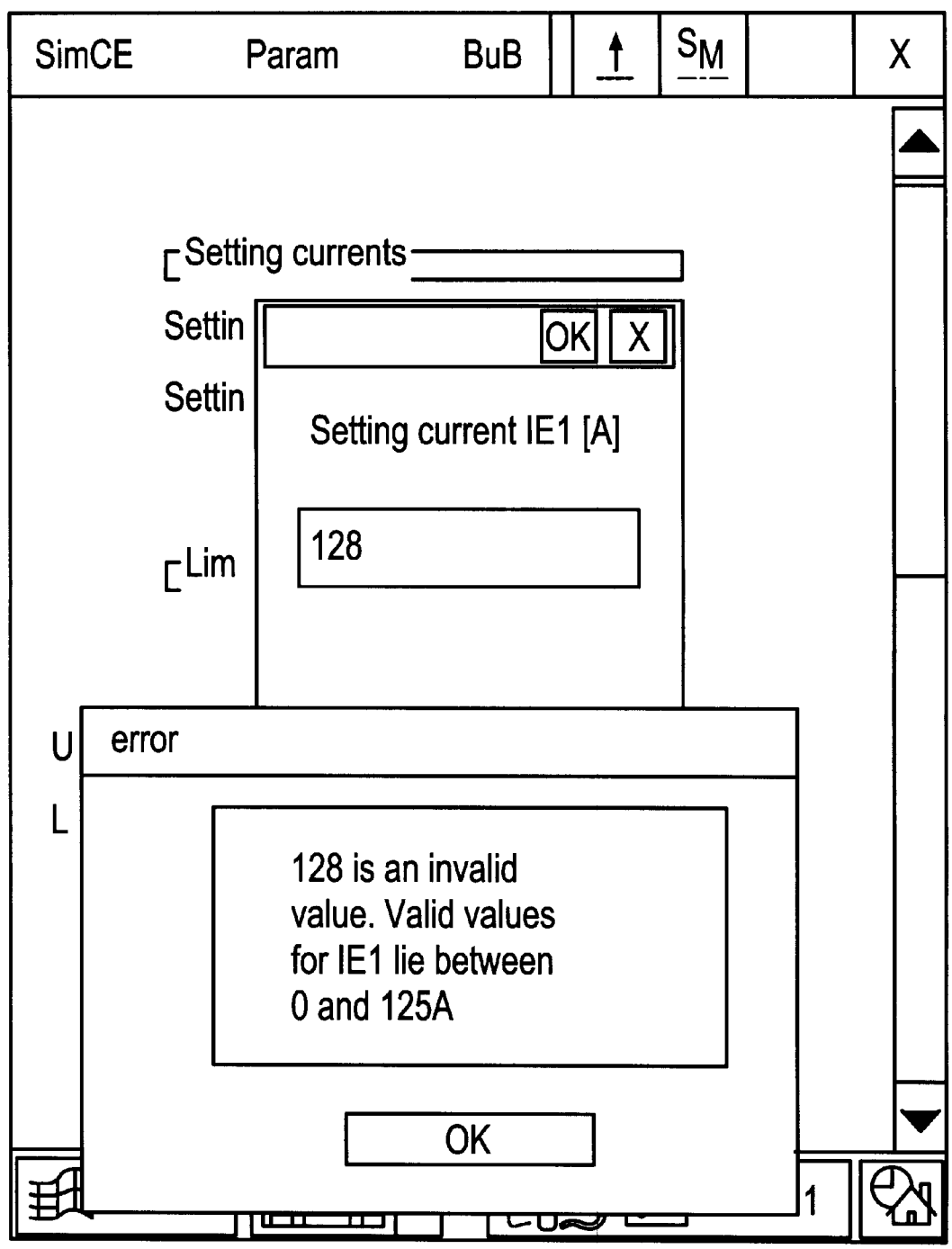
FIG. 6 shows a snapshot of a screen showing an error message.

FIG. 5 shows a preferred embodiment of a screen with help information displayed. As is clearly shown, context-sensitive help is displayed when requested by the user. FIG. 6 shows a preferred embodiment of a screen with error information displayed. When a value that is outside of the allowed range of values for a parameter, such an error message is displayed.

B. Method of Interactively Inputting Values

Figure 3:
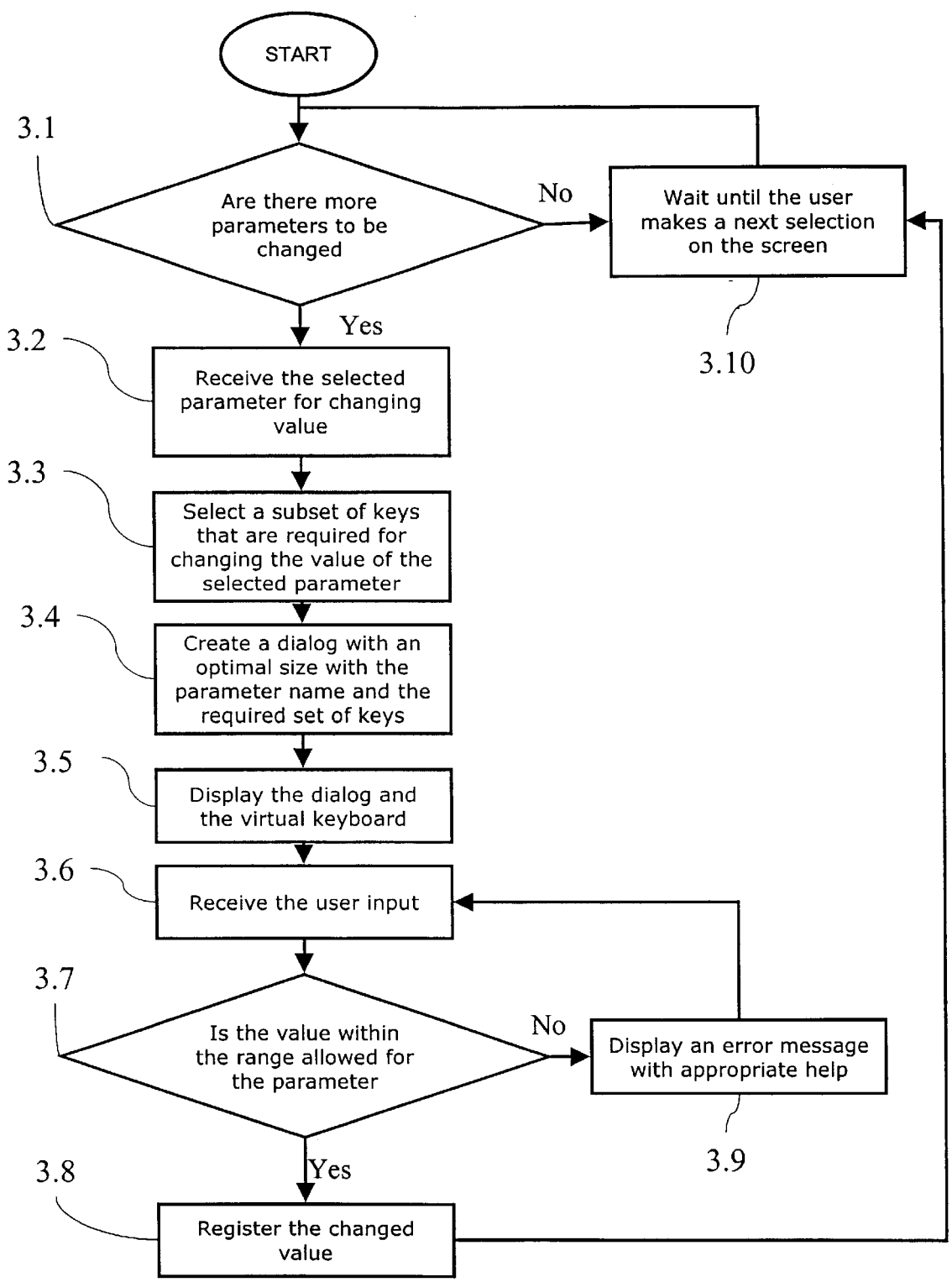
FIG. 3 shows a flowchart illustrating a preferred embodiment of the method according to the present invention.

Another important aspect of the present invention is a method for inputting parameter values into a computer. FIG. 3 shows a flowchart depicting a preferred embodiment of the method for inputting parameter values according to the present invention. The user selects a parameter from the screen for which the value is to be changed. The system checks if there are any more parameters to be changed at step 3.1. If not, the system waits and continues checking in step 3.10 until a parameter is selected by the user. In step 3.2, the system receives the selected parameter. A subset of required keys from the set of keys are selected in step 3.3.

An important feature of this invention is that only those keys that are required for changing the values of the parameters are selected for display. A dialog is created in step 3.4 with an optimal display size with the parameter name and the required set of virtual keys. In step 3.5, this dialog is displayed. In step 3.6, the system receives an input from the user. In step 3.7, the system checks to see if the value entered by the user is within the allowable range of values for the parameter. If not, an error message is displayed in step 3.9 and the system proceeds to receive anther input from the user. If the value is within the allowable range, the system registers the value in step 3.8. After the value is registered, the system proceeds to wait for the user to make a new selection by returning to step 3.10.

C. Computer Program Product

A further important aspect of the present invention is a computer program product. The computer program product comprises a computer readable medium. This computer readable medium includes, but is not limited to, floppy disks, hard disks, CDs, tapes, etc. Downloading the software through the Internet or other data transmission medium is also within the scope of the present invention.

The computer readable medium comprises a selector code, a dialog code, a keyboard code and a data receiving code. The selector code enables a user to select a parameter displayed on a screen. The dialog code displays the dialog associated with the parameter on the screen. The keyboard code enables the computer to display a virtual keyboard on the screen. The data receiving code enables a user to input parameter values using the virtual keyboard, The virtual keyboard that is displayed comprises only those keys that are relevant to changing the value of the parameter. It should be noted that the computer code is not restricted to any particular type of code. The code may include, but is not limited to any one of: source code, object code, executable code, etc. Further, the code could be in any type of language including, but not limited to at least any one of: higher level languages, assembly language, machine language, etc.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

I claim:

1. A computer system with a screen, memory and a set of parameters, said system comprising:

an interactive input field for at least one parameter of said set of parameters, wherein said set of parameters are capable of controlling an external application; and a set of virtual keys stored in the memory, wherein, on selecting said at least one parameter displayed on the screen, the interactive input field associated with the selected parameter and a subset of said set of virtual keys is displayed on the screen, wherein the subset of said set of virtual keys is created dynamically based on said selected parameter, wherein the subset of said set of virtual keys comprises only those keys that are relevant to changing a value of the selected parameter and wherein the subset of said set of virtual keys is less in number than the set of virtual keys.

2. The computer system of claim 1, wherein the computer system is a palm-held computer.

3. The computer system of claim 1, wherein the displayed subset of virtual keys does not overlay the displayed interactive input field.

4. The computer system of claim 1, further comprising a set of information items for said at least one parameter, said set of information items being stored in the memory, wherein the set of information items comprises parameter name, parameter type, and limit values for the parameter.

5. The computer system of claim 4, wherein the set of information items further comprises help information associated with the parameter.

6. The computer system of claim 5, wherein the help information is a help information in a Windows 95® format.

7. The computer system of claim 4, wherein an error message is displayed when a user enters a value for the parameter that is outside of the limit values for the parameter.

8. The computer system of claim 1, wherein said system further comprises an interactive input field each for each of said set of parameters and a set of information items each for each of said set of parameters.

9. The computer system of claim 1, wherein the external application is an application for controlling a manufacturing operation.

10. The computer system of claim 1, wherein display sizes of the subset of keys are enhanced.

11. A computer system comprising a palm-held computer including a touch-sensitive screen and a memory, said memory comprising instructions, said instructions enabling the computer to enable a user to select a parameter by touching the touch-sensitive screen, said instructions further enabling the computer to display a subset of a set of virtual keys that are dynamically created based on the parameter, and said subset of said set of virtual keys comprising only those keys required to change the value of the parameter, wherein the parameter is one of a set of parameters capable of controlling an external application and wherein the subset of said set of virtual keys is less in number than the set of virtual keys.

12. The computer system of claim 11 wherein said instructions further enable the computer to monitor whether a value entered by the user is within a preset range of values for the selected parameter.

13. The computer system of claim 11 wherein said instructions further enable the computer to display help information for the selected parameter on indication by the user.

14. The computer system of claim 11, wherein the external application is an application for controlling a manufacturing operation.

15. The computer system of claim 11, wherein display sizes of the subset of keys are enhanced.

16. A method of inputting values for a parameter into a computer system comprising:

(a) selecting the displayed parameter on a screen;

(b) displaying a dialog including an interactive input field associated with the parameter on the screen;

(c) displaying a subset of a set of virtual keys on the screen; and (d) using the subset of the set of virtual keys to input values for the parameter, wherein the subset of said set of virtual keys to input values for the parameter, wherein the subset of said set of virtual keys is created dynamically based on said selected parameter, and wherein the parameter is one of a set of parameters capable of controlling an external application, wherein the subset of said set of virtual keys comprise only those keys that are relevant to changing a value of the selected parameter and wherein the subset of said set of virtual keys is less in number than the set of virtual keys.

17. The method of claim 16 wherein the displayed subset of virtual keys does not overlay the interactive input field.

18. The method of claim 16 wherein the displayed parameter is associated with a set of information items comprising parameter name, parameter type and limit values for the parameter.

19. The method of claim 18 wherein the set of information items further comprises help information.

20. The method of claim 19 wherein the help information associated with the parameter is displayed using a Windows 95® help format.

21. The method of claim 16 wherein an interactive input field each is associated with each of said set of parameters and a set of information items each is associated with each of said set of parameters.

22. The method of claim 16 further comprising (e) displaying an error message on entry of a value outside the limit values for the parameter.

23. The method of claim 16, wherein the external application is an application for controlling a manufacturing operation.

24. The method of claim 16, wherein display sizes of the subset of keys are enhanced.

25. A computer program product, including a computer readable medium comprising instructions, said instructions comprising:

a selector code to enable a user to select a parameter displayed on a screen;

a dialog code to display a dialog associated with the parameter on the screen;

a keyboard code to display a subset of a set of virtual keys on the screen; and a data receiving code, to enable a user to input parameter values using the subset of said set of virtual keys, wherein, the subset of said set of virtual keys is created dynamically based on the selected parameter, wherein the selected parameter is one of a set of parameters capable of controlling an external application, wherein the subset of said set of keys comprise only those keys that are relevant to changing a value of the selected parameter and wherein the subset of said set of virtual keys is less in number than the set of virtual keys.

26. The computer program product of claim 25, wherein the displayed subset of virtual keys does not overlay an interactive input field associated with the parameter.

27. The computer program product of claim 25, further comprising an information code to store information associated with the parameter, said information comprises parameter name, parameter type and limit values of the parameter.

28. The computer program product of claim 27, wherein said information further comprises help information.

29. The computer program product of claim 28, wherein the help information is displayed using a Windows 95® format.

30. The computer program product of claim 27, further comprising an error message code to display an error message on entry of a value outside the limit values for the parameter.

31. The computer program product of claim 25, wherein the external application is an application for controlling a manufacturing operation.

32. The computer program product of claim 25, wherein display sizes of the subset of keys are enhanced.

* * * * *